(12) United States Patent
Delfini et al.

(10) Patent No.: US 7,111,405 B2
(45) Date of Patent: Sep. 26, 2006

(54) HAND-OPERATED JIG-SAW WITH SAW BLADE GUIDANCE SYSTEM

(75) Inventors: Stefano Delfini, Bettlach (CH); Beat Gerber, Utzenstorf (CH); Siegfried Keusch, Deizisau (DE); Cornelius Van Der Schans, Burgdorf (CH)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 10/496,160

(22) PCT Filed: Jun. 17, 2003

(86) PCT No.: PCT/DE03/02021

§ 371 (c)(1),
(2), (4) Date: May 20, 2004

(87) PCT Pub. No.: WO03/106087

PCT Pub. Date: Dec. 24, 2003

(65) Prior Publication Data

US 2005/0000098 A1 Jan. 6, 2005

(30) Foreign Application Priority Data

Jun. 17, 2002 (DE) ................................ 102 27 058
Feb. 27, 2003 (DE) ................................ 103 08 828

(51) Int. Cl.
*B27B 11/02* (2006.01)

(52) U.S. Cl. ............................................ 30/392; 83/762
(58) Field of Classification Search .......... 30/392–394, 30/337; 83/699.21, 698.31, 758, 783, 761–763, 83/820; 279/77
See application file for complete search history.

(56) References Cited

U.S. PATENT DOCUMENTS

| 4,308,852 A | * | 1/1982 | Gebhart .................. 125/16.01 |
| 4,837,935 A | * | 6/1989 | Maier et al. .................. 30/392 |
| 5,644,847 A | * | 7/1997 | Odendahl et al. ............. 30/394 |
| 6,810,589 B1 | * | 11/2004 | Lagaly et al. ................. 30/392 |
| 2002/0178591 A1 | * | 12/2002 | Hecht et al. .................. 30/392 |

FOREIGN PATENT DOCUMENTS

| DE | 29910173 | 9/1999 |
| DE | 10045890 | 4/2002 |
| WO | 02/22297 A1 | 3/2002 |

* cited by examiner

*Primary Examiner*—Kenneth E. Peterson
*Assistant Examiner*—Laura Brean
(74) *Attorney, Agent, or Firm*—Michael J. Striker

(57) ABSTRACT

A power scroll saw with a housing and a saw blade capable of being driven in a reciprocating manner, and with tongs-like guides that guide the saw blade in a laterally-supported manner is capable of being used in a variety of work applications due to the fact that the guide means are capable of being switched by hand selectively into a position having lateral clearance from the saw blade and into a position in which they laterally support the saw blade.

6 Claims, 6 Drawing Sheets

HAND-OPERATED JIG-SAW WITH SAW BLADE GUIDANCE SYSTEM

BACKGROUND INFORMATION

The present invention is relates to a power scroll saw 1.

A power scroll saw with saw blade guidance system is made known in WO 02/22297, which guides the flat sides of the saw blade between two lateral clamping jaws. According to the invention, the clamping jaws are controlled using a servomotor.

SUMMARY OF THE INVENTION

The present invention has the advantage that the guide system is selectively activated and/or deactivated.

In addition, the clamping means—which automatically adjust to the position of the saw blade—have the advantage that the two flat sides of the saw blade are guided with matching, minimal bearing force, and undesirably high friction forces between the guide means and the saw blade are prevented.

Due to the fact that the guide means are elastically situated in such a manner that they attempt to move into the activated position bearing on the saw blade, an abrupt activation of the guide means is selectively possible in the deactivated position as soon as the working conditions require this. Due to the fact that a push-button is provided that, when it is actuated, the clamping means move into their activated position of supporting the saw blade, activation of the guide means is particularly convenient.

Due to the fact that an actuation means for deactivating the guide means is located on the saw blade clamping mechanism, the guide means are automatically deactivated when the saw blade is replaced or removed.

Due to the fact that the chuck lever serving as actuating lever for moving the guide tongs into the "open" position for removing or clamping the saw blade is provided with wedge means, in particular a ramp, with which the driving pin, together with the sliding members, is capable of being displaced downward, a reliable, robust actuating mechanism for deactivating the guide means is created.

Due to the fact that two sliding members for closing and/or opening the tongs-like guide means are supported such that they are relatively parallel to each other and are displaceable along a straight line, whereby one sliding member forcibly carries along the other in a direction of travel and is capable of being moved back in the opposite direction of travel independently of the sliding member that was carried along, simple and robust machine elements are used that ensure a high level of reliability of the power scroll saw.

Due to the fact that spring-preloaded sliding members, with slide guide slots, overlap lobes of the guide means, in particular guide jaws, a simple and reliable actuating mechanism is created for closing and/or opening the guide tongs. Due to the fact that the sliding members are capable of being displaced, coupled together, in such a manner that a certain amount of play relative to each other exists along their displacement path, a self-orienting positioning of the clamping jaws relative to the saw blade is possible, with which deviations in the saw blade position from the ideal position are tolerated. This is achieved by situating a driving means between the first and second sliding member, whereby, in the "closed" position of the guide tongs, an axial clearance of approximately 0.5 mm exists between the driving means and the second sliding member in the direction of displacement toward the "open" position.

Due to the fact that the slide guide slots of the sliding members are situated at an angle relative to vertical compared to the glide bolt of the tong jaws in the self-locking range, in particular 5 to 6 degrees of inclination from vertical, the clamping jaws are capable of being closed with a high amount of holding force, so that the clamping tongs cannot be opened by external forces and/or if the saw blade bears against it with a high amount of force.

Due to the fact that a finger protection mechanism is mounted on the housing, the risk of injury when working with the power scroll saw is markedly reduced, and the U-shaped configuration of the finger protection mechanism allows the saw blade to be easily discernable and guidable in a controlled manner.

DESCRIPTION OF THE PREFERRED EMBODIMENTS

Figure 1:
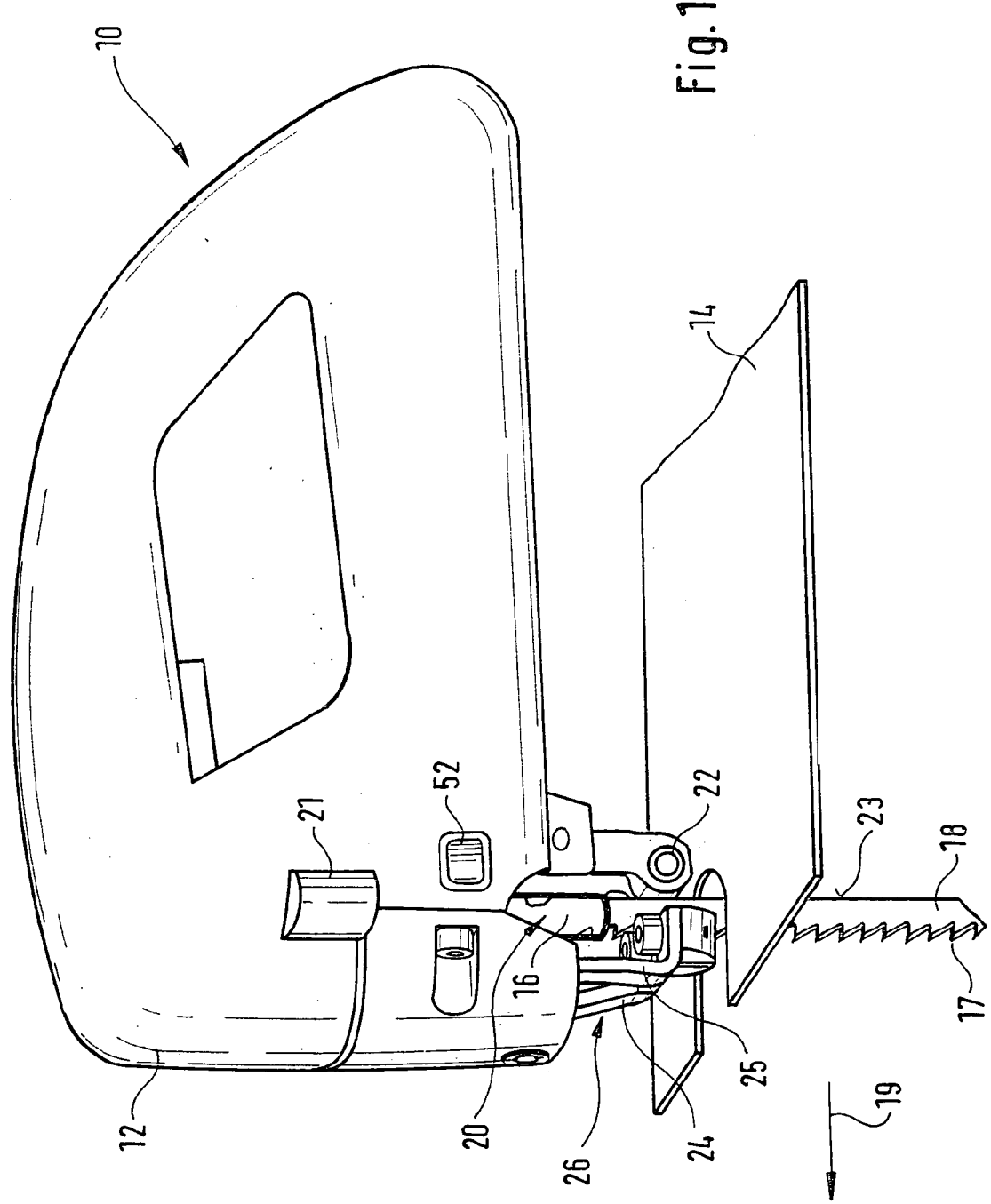
FIG. 1 shows a schematic depiction of a first exemplary embodiment of the invention.

FIG. 1 shows a schematically depicted, handheld reciprocating saw 10 at an angle from above, which accommodates a not-shown electric motor with a gearset in a housing 12 for the reciprocating driving of a reciprocating rod 16. A saw blade 18 is detachably but captively coupled to reciprocating rod 16 with its clamping end, the saw blade passing downward—as shown in the figure—through a base plate 14 of reciprocating saw 10.

Saw blade 18 bears—with its saw blade back 23, which is diametrically opposed to toothed side 17—against a support roller 22 that, oscillating back in forth in feed direction 19, can impart a reciprocating motion to saw blade 18, being energizable as necessary.

In addition, guide means configured as guide tongs 26 extend in front of toothed side 17 of saw blade 18 above base plate 14, the guide means being capable of supporting saw blade 18 on its flat sides in a diametrically opposed manner.

Using spring tension, a distance between guide jaws 24, 25 of guide tongs 26 is capable of being adapted to the particular thickness of clamped saw blade 18. Guide jaws 24, 25 are capable of being pivoted around a rotation point 30 (FIG. 4) between the dosed position and the open position. In the closed position, the outermost ends of guide jaws 24, 25 bear laterally against the flat sides of the saw blade.

The lower end of reciprocating rod 16 is equipped with a clamping device 20 in which the clamping end of saw blade 18 is capable of being clamped in a captive manner and is capable of being detached by actuating a chuck lever 21. When chuck lever 21 is actuated, guide tongs 26 are switched to the open position, whereby this position is capable of being selectively changed to the closed position—in which guide jaws 24, 25 bear against saw blade 18—by actuating a side button 52.

Figure 2:
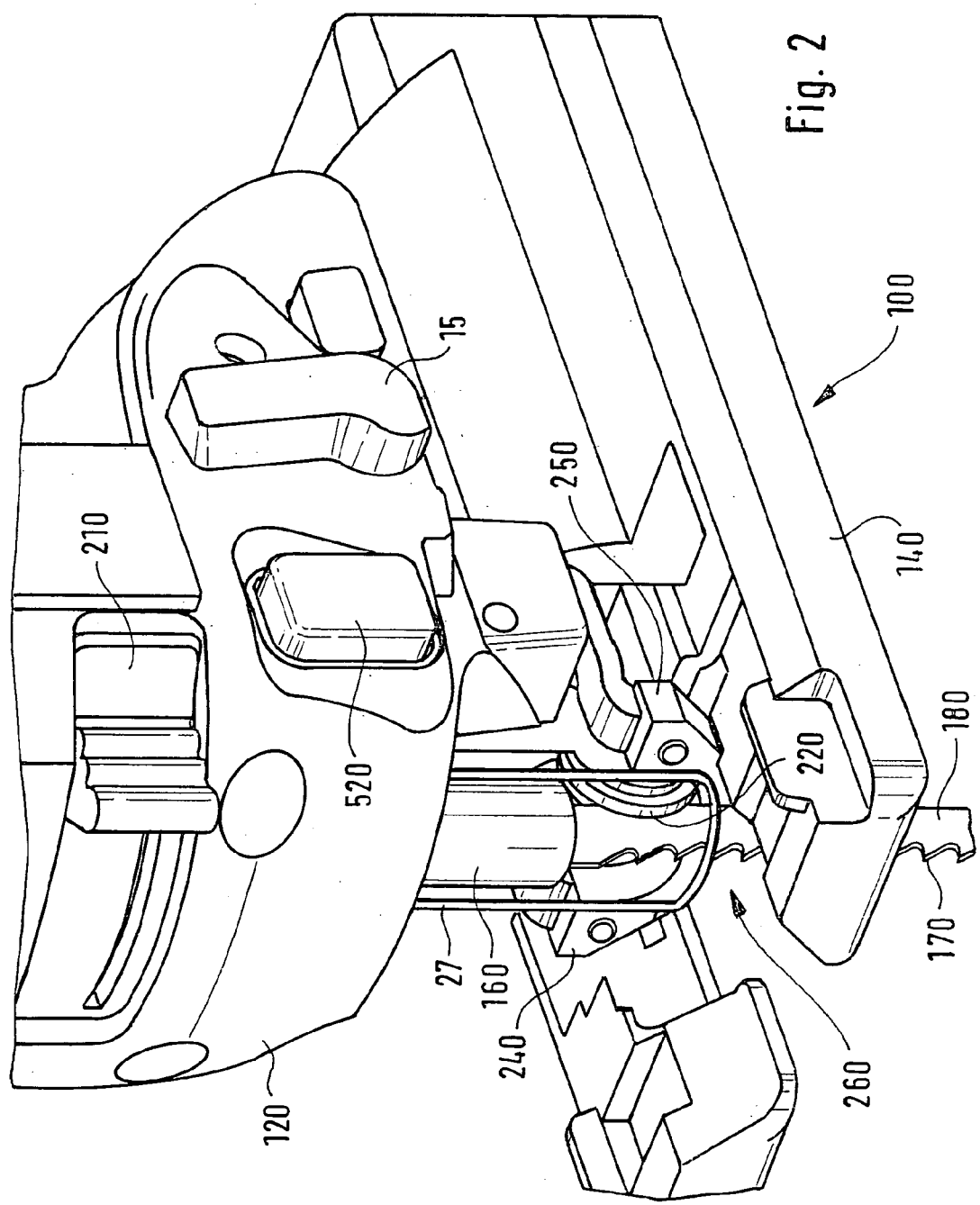
FIG. 2 shows a side view of a second exemplary embodiment of the invention.

FIG. 2 shows a further exemplary embodiment of a reciprocating saw 100, which conforms, in principle, with that according to FIG. 1, the guide tongs 260 of which, however, extend laterally relative to support roller 220 and, as shown in the figure, are angled to the right, so that it extends behind reciprocating rod 160 and into the interior of housing 120. As shown in the figure, a U-shaped protective frame 27 extends parallel with said reciprocating rod from top to bottom, attached to housing 120, the protective frame serving as finger protection against accidental contact with saw blade 180 and protecting the operator of reciprocating saw 100 from injury.

Housing 120 is capable of being coupled with a base plate 140 in a pivoting manner, and saw blade 180 is capable of being supported laterally by guide jaws 240, 250. A chuck lever 210 is situated above the region where reciprocating rod 160 exits housing 120, which is capable of being pivoted to the left, as viewed in the figure-transversely across the front region of housing 120-to remove saw blade 180. A push-button 520 is situated below operating lever 210; when it is actuated, guide tongs 260 close abruptly to laterally support saw blade 180.

A pivoted lever 15 for adjusting the reciprocating stroke of pendulum roller 220 is provided behind push-button 520, as viewed in the figure.

The functional elements that are explained in FIG. 1 and are equally-acting and identically configured in FIG. 2 have the same reference numerals as in FIG. 1, but with a zero added at the end.

Figure 3:
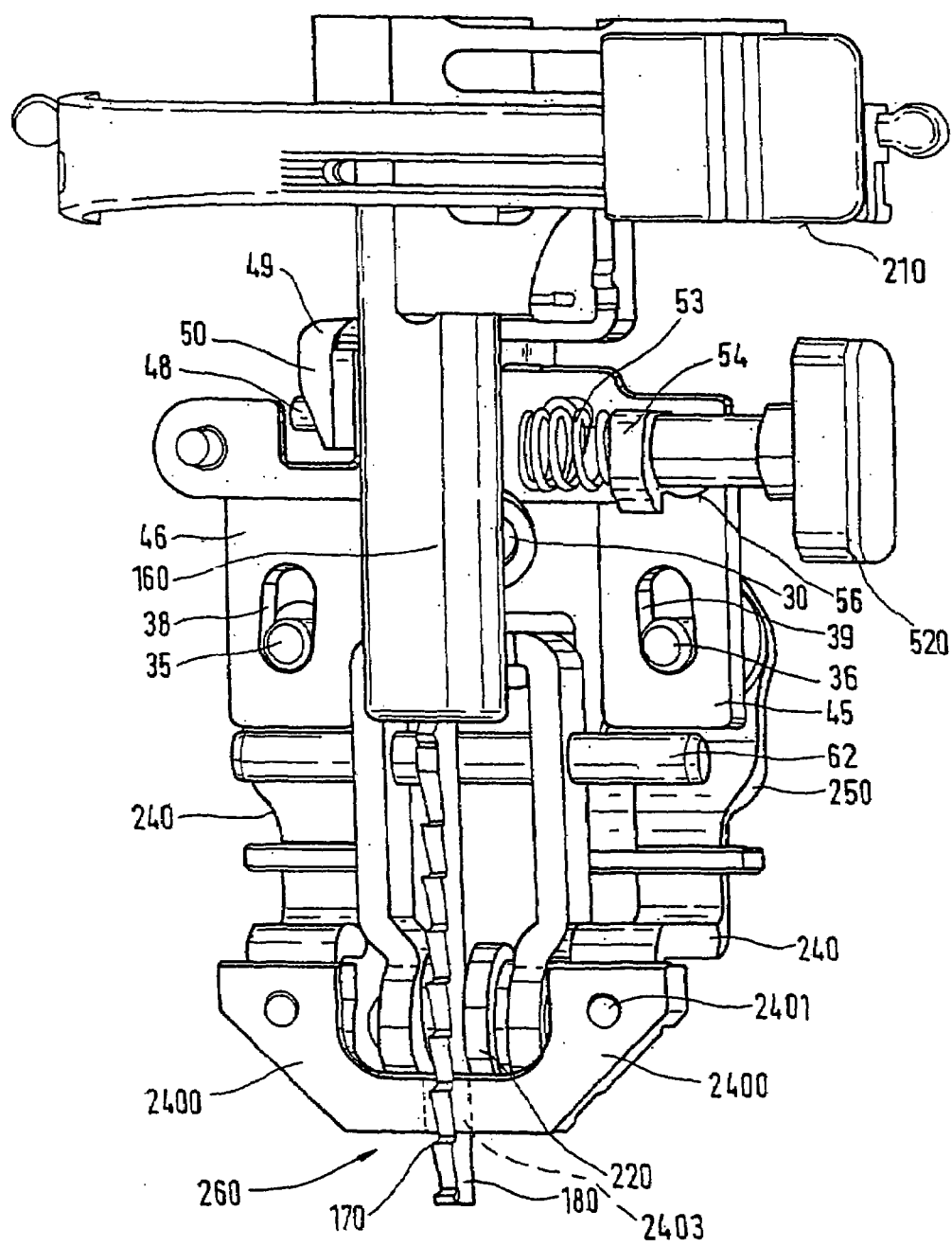
FIG. 3 shows the assembly of the guide means.

FIG. 3 shows the assembly of guide tongs 260 in their position relative to reciprocating rod 160 and pendulum roller 220. It is clear that guide jaws 240, 250 extend—angled horizontally—from toothed side 170 of saw blade 180 rearward toward pendulum roller 220 and, angled once more, vertically upward, are coupled at rotation point 30 so as to be secured to the housing. Mounted on each guide jaw 240, 250 is a glide bolt 35, 36—which extends toward the front out of the viewing plane—each of which passes through a slide guide slot 38, 39 of two sliding members 45, 46, which are displaceable upward and/or guided to the bottom left. Slide guide slots 38, 39 extend with an approximately 5-degree inclination from the vertical and/or toward the axis of reciprocating rod 160, so that, when sliding members 45, 46 are slid upward—as viewed in the figure—guide bolts 35, 36 are displaced outwardly and, with this displacement, guide jaws 240, 250 pivot outwardly and open. If sliding members 45, 46 are slid dowward, slid guide slots 38, 39 carry guide bolts 35, 36 along with them in such a manner that said guide bolts move toward each other, so that guide tongs 260 close and the lower ends of guide jaws 240, 250 bear laterally against saw blade 180. Sliding members 45, 46 are elastically preloaded by compression springs 42, 43 (FIGS. 5, 6) and attempt to press sliding members 45, 46 axially upward.

Mounted on the axial extension of push-button 520 is a sliding element that extends—on a lobe 56 in the upper region of sliding member 45—toward push-button 520. In FIG. 3, push-button 520 is slid toward the left—as viewed in the figure—whereby it bears against a compression spring 53 and has displaced its sliding element 54 in the "released" position relative to lobe 56. As a result, sliding member 45 can be abruptly displaced into its upwardly oriented position, whereby it releases the second sliding member 46 that is pressed downward with its driving pin 48. When actuating lever 210 is pivoted toward the left—as viewed in the figure—an arm on which a ramp 50 is mounted, the arm being rigidly coupled with said actuating lever—is rotated approximately centrally around the axis of reciprocating rod 160, whereby driving pin 48 and the two sliding members 45, 46 are pressed downward. Sliding member 54 reaches its locked position relative to lobe 56 as soon as said lobe is slid downward together with sliding member 45. Lobe 56—which previously was holding sliding member 54 in its closed position—thereby releases sliding member 54 again, so that push-button 520—preloaded by compression spring 53—is capable of being displaced into its open position again, in which lobe 56 is locked in the vertical direction of motion by sliding member 54.

Figure 4:
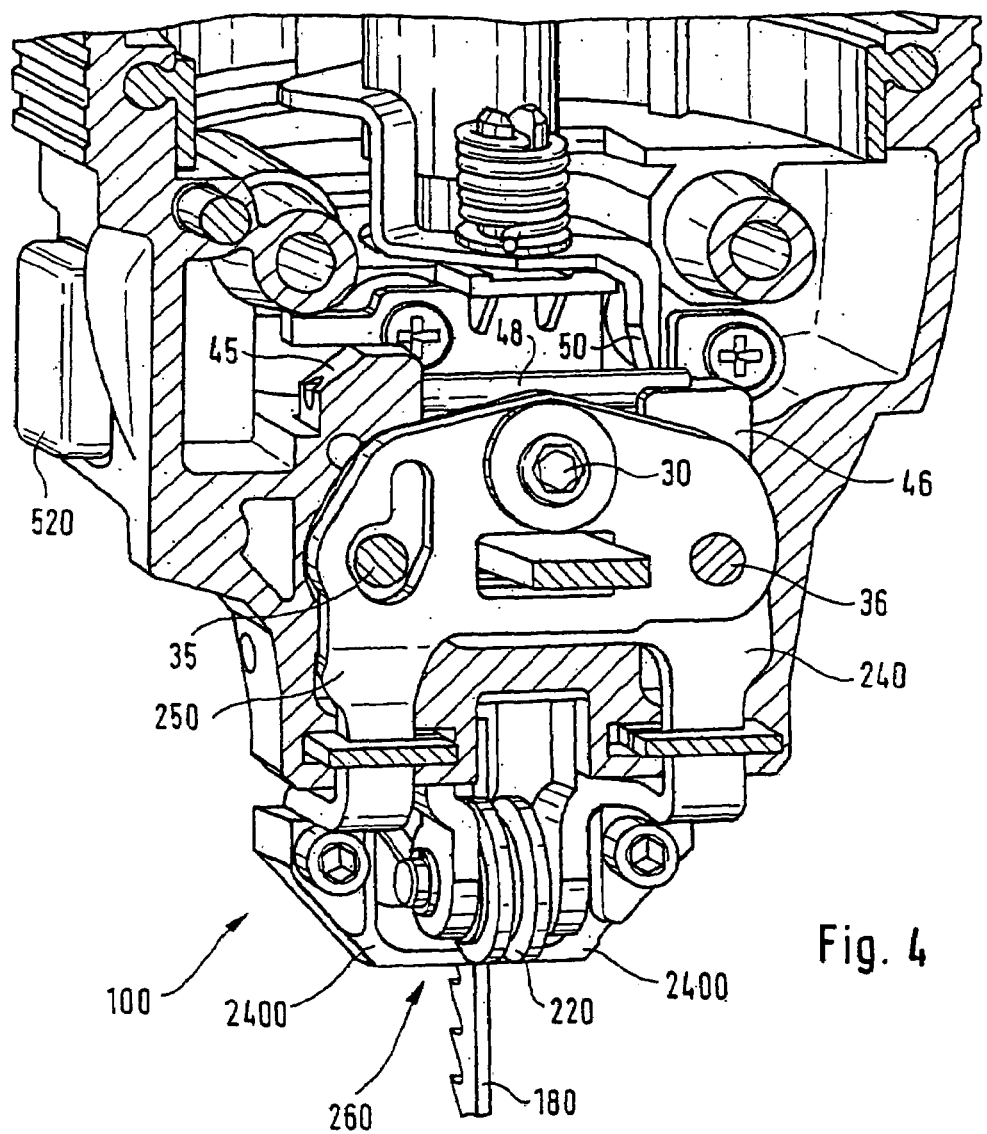
FIG. 4 shows a cross section with inside view, from behind, of the guide means.

FIG. 4 shows a cross section of power scroll saw 100 in the region of guide tongs 260 as viewed from the rear, whereby rotation point 30 of guide jaws 240, 250 is particularly clearly visible, and is formed by a stud. Sliding members 45, 46—which are partially covered by guide jaws 240, 250—are slid into their position vertically upward, so that guide tongs 260 are in the closed position. Ramp 50 has thereby released driving pin 48 end, with this, sliding member 45 shown an the left in the figure, which is followed by shorter sliding member 46. Driving pin 48 is captively pressed into longer sliding member 45 in a bore (not shown in greater detail) transversely to its direction of displacement, whereby it partially penetrates, with its exposed end, a groove-like recess (not shown in greater detail) in the upper front side of shorter sliding member 46.

Push-button 520 remains in its inwardly-pressed position as long as sliding member 45 remains in its vertically uppermost position. Glide bolts 35, 36, the rear views of which are visible in guide jaws 240, 250, are thereby pivoted toward each other, so that guide tongs 260 are in the closed position.

Figure 5:
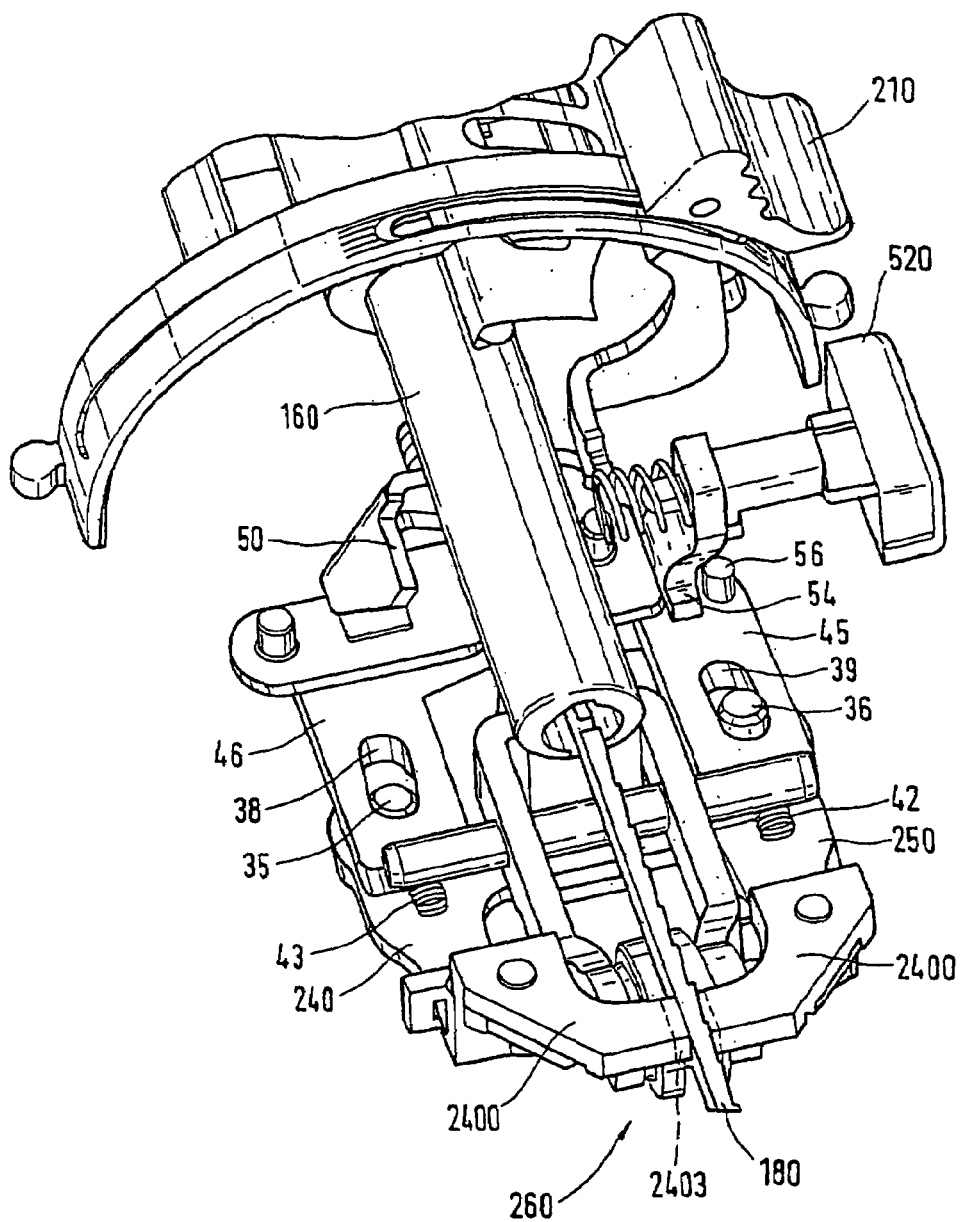
FIG. 5 shows the guide means in the closed position.

FIG. 5 shows guide tongs 260 in their closed position, in which sliding members 45, 46 are upwardly displaced and lobe 56 locks sliding member 54 in place, so that push-button 520 remains pressed axially inwardly. As long as chuck lever 210 is pivoted to the left—as viewed in the figure—ramp 50 glides in a wedge-like manner toward driving pin 48, so that, as described previously, sliding members 45, 46 are displaced downwardly—as viewed in the figure—and the clamping tongs are opened.

Figure 6:
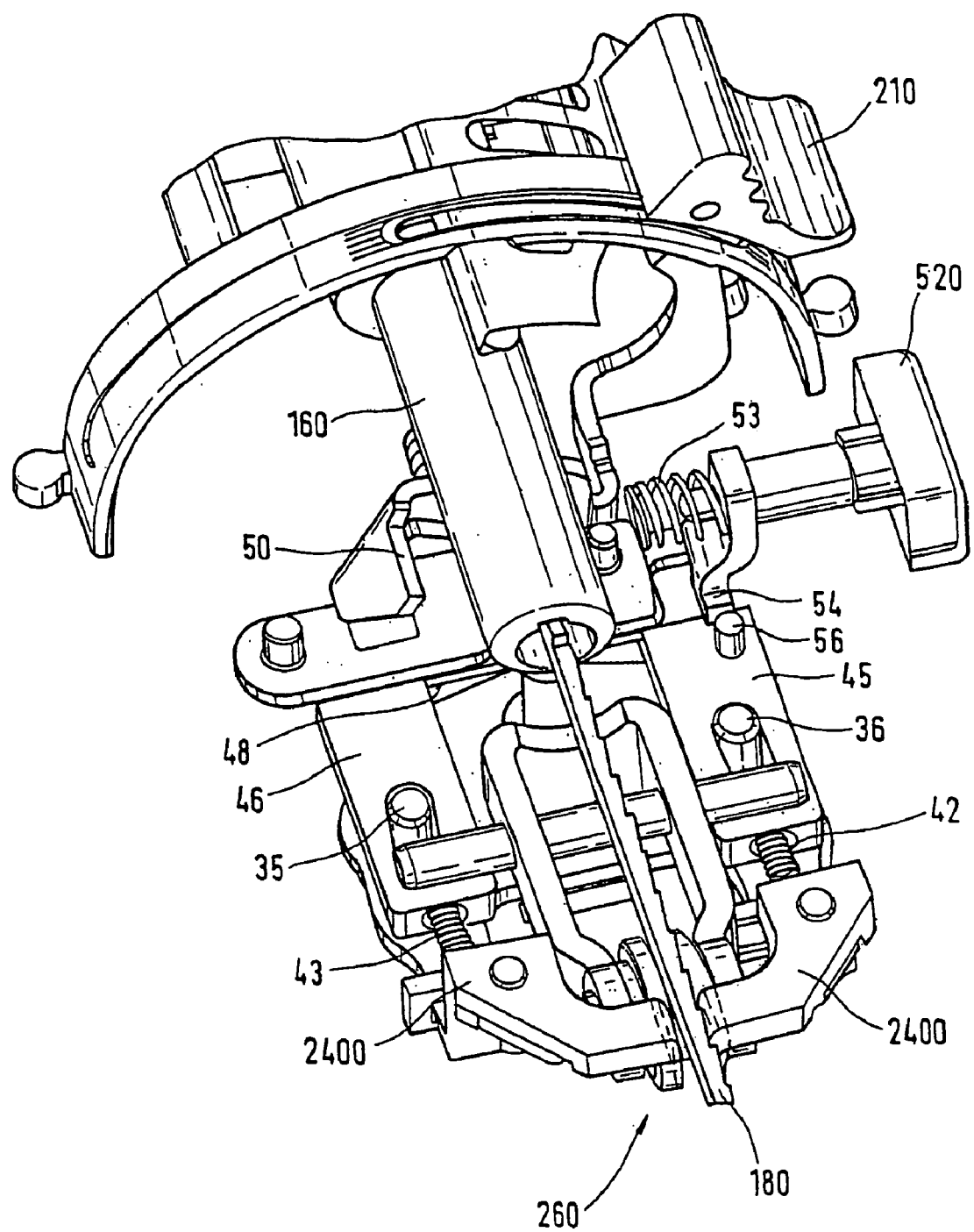
FIG. 6 shows the guide means in the open position.

FIG. 6 shows guide tongs 260 according to FIG. 5 in the open position, because sliding members 45, 46 are slid vertically downward against compression springs 42, 43, thereby spreading apart guide bolts 35, 36 and, therefore, guide jaws 240, 250. Lobe 56 has slid past sliding member 54 to the right—as viewed in the figure—and has released said sliding member from the preload force of compression spring 53—so that push-button 520 can be displaced into the open position to the right, as viewed in the figure. In this position, sliding member 54 is positioned above lobe 56 and locks it and/or sliding member 45 in the upward direction of motion. Since sliding member 45 with its driving pin 48 at the top bears against adjacent sliding member 46, this sliding member 46 must follow the motion of driving pin 48 downward, acted upon by ramp 50. In the closed position according to FIG. 4, driving pin 48 has a vertical clearance of approximately 0.5 mm relative to sliding member 46, so that driving pin 48 first must be pressed downward by this amount before sliding member 46 is acted upon and can follow the motion. As a result, in the closed position, adjustments can be made within a certain tolerance range relative to the center position of saw blade 180. If saw blade 180, as a result of a center position, is closer to guide jaw 240, it will bear laterally against saw blade 180 first, displaced by sliding member 46 and/or by guide bolt 35, so that adjacent guide claw 250—adjusted by the free, upwardly movable, longer sliding member 45—comes to rest at the side of saw blade 180 somewhat later. Due to the self-locking in slide guide slot 38, 39, slide guide bolts 35, 36 are positioned in the locked position, and guide jaws 240, 250 cannot be moved outwardly, into the position in which guide tongs 260 are open. If, as a result of an inclined position of saw blade 180, guide jaw 250 is the first to comes to rest on saw blade 180 due to the upward motion of sliding member 45 and the inward displacement of guide pin 36 in the guide slot, the left—as viewed in the figure—guide jaw 240 must cover a longer actuating path, which it realizes by left sliding member 46 being able to move toward driving pin 48 by the amount exceeding the amount of approximately 0.5 mm above its zero position, and thereby very securely come to rest on the lateral surface of saw blade 180. A secure, uniform guidance of saw blade 180 is thereby ensured within the foreseeable tolerance range.

What is claimed is:

1. A power scroll saw (10, 100) with a housing (12, 120) and a saw blade (18, 180) capable of being driven in a reciprocating manner, and with tongs-like guide means (26, 260) that guide the saw blade (18, 180) in a laterally-supported manner, wherein the guide means (26, 260) are capable of being switched by hand selectively into a position having lateral clearance from the saw blade (18, 180) and into a position in which they laterally support the saw blade (18, 180), wharein the guide means (26, 260) attempt to move, with spring preload, into the position in which they laterally support the saw blade (18, 180), wherein a push-button (52, 520) is provided, and when it is actuated, the guide means (26, 260) abruptly move into their position in which they laterally support the saw blade (18, 180), wherein elastically preloaded sliding members (45, 46) guided along a straight line are provided for closing and/or opening the tongs-like guide means (26, 260), wherein the two sliding members (45, 46) are supported such that they are displaceable relative to each other, whereby one sliding member (45) forcibly carries along the other (46) in a direction of travel and is capable of being moved back in the opposite direction of travel, wherein a driving means (48) is situated between the first sliding member (45) and the second (46), whereby, in the "closed" position of the guide tongs (26), an axial clearance of approximately 0.5 mm between the driving means (48) and the second sliding member (46) exists in the direction of displacement toward the "open" position.

2. The power scroll saw as recited in claim 1, wherein a further push-button (21, 210) is provided; when it is actuated, the guide means (26, 260) move into their deactivated position with lateral release of the saw blade (18, 198), the guide means being lockable, with release capability, in this position.

3. The power scroll saw as recited in claim 1, wherein a further push button (21) serving as actuating means (21) for moving the guide tongs (26) into the "open" position is provided with wedge means, in particular a ramp (50), with which the driving means (48), together with the sliding members (45), is capable of being displaced downward.

4. The power scroll saw as recited in claim 1, wherein the sliding members (45, 46), with slide slots (38, 39), overlap guide bolts (35, 36) of guide jaws (24, 25) in such a manner that they open the guide tongs (26) when moved downward and they close the guide tongs (26) when moved upward.

5. The power scroll saw as recited in claim 4, wherein the slide slots (38, 39) extend at such an angle to the guide bolts (35, 36) that only the sliding members (45, 46), when displaced, can displace the glide bolts (35, 36), but the guide bolts (35, 36) cannot displace the sliding members (45, 46).

6. The power scroll saw (10) as recited in claim 1, wherein a finger protection mechanism (27) extends on the front side of the saw blade (18) parallel with said saw blade, toward the base plate (14), the finger protection mechanism being captively fastened to the housing (12).

* * * * *